Patented Apr. 9, 1929.

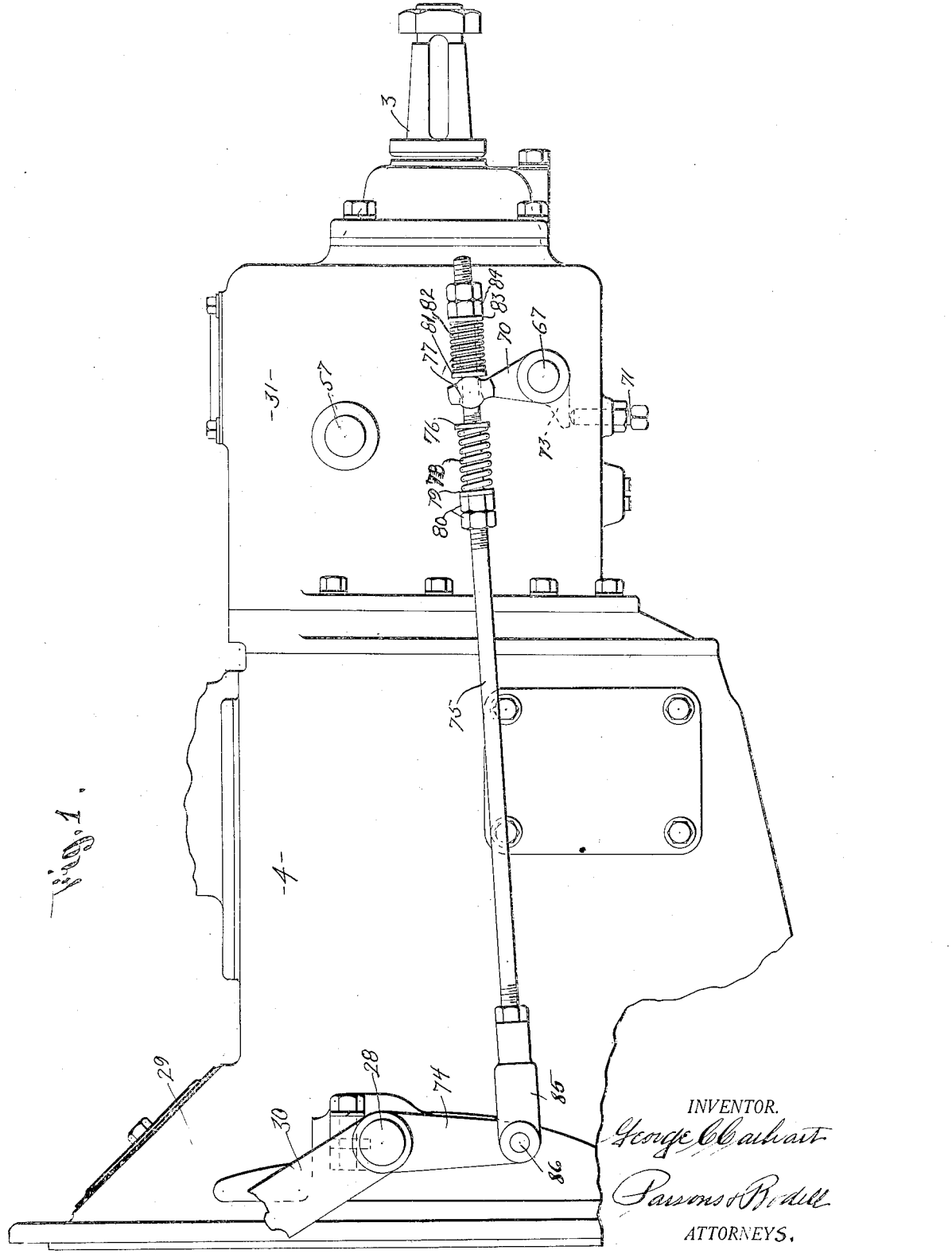

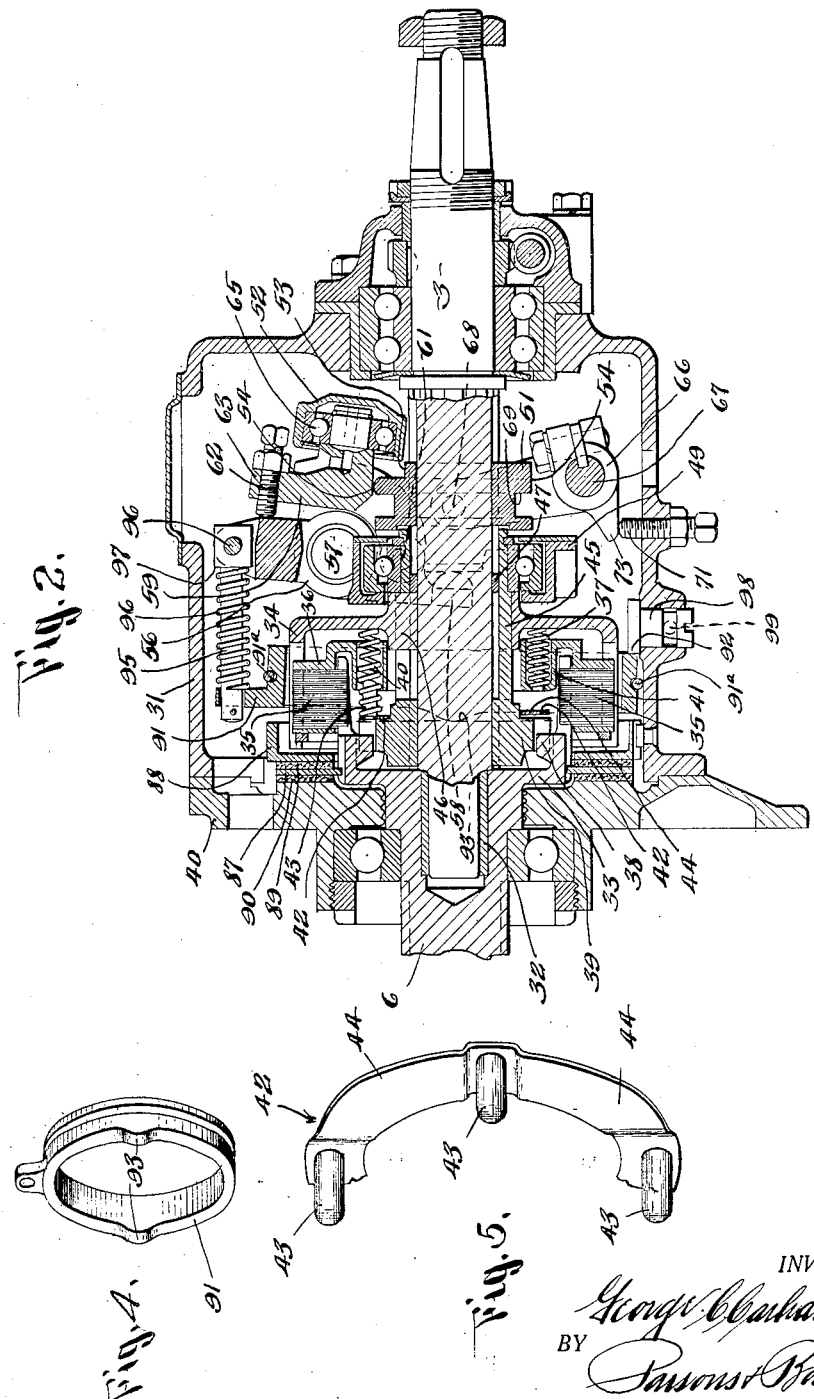

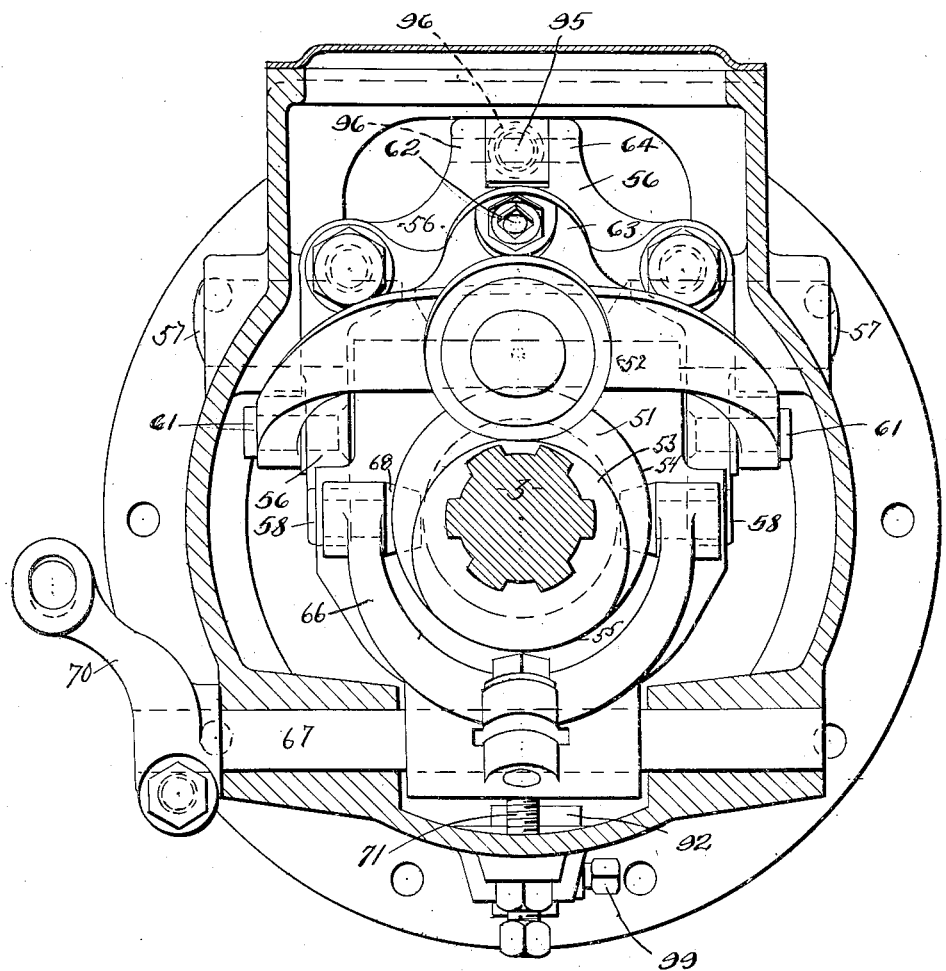

1,703,440

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

TRANSMISSION MECHANISM HAVING POWER-OPERATED CLUTCH.

Application filed January 21, 1925. Serial No. 3,845.

This invention relates to transmission mechanism for motor vehicles and has for its object a particularly simple and efficient power operated clutch shifting means and more particularly a power means self contained within the transmitting mechanism for throwing out the auxiliary or rear clutch between the change speed gearing and the driven shaft which is connected to the propeller shaft of the vehicle in contradistinction to the shifting means operated by a source of power added to the transmission mechanism.

The invention consists in the novel features and in the combinations and constructions hereinafter set forth and claimed.

In describing this invention, reference is had to the accompanying drawings in which like characters designate corresponding parts in all the views.

Figure 1 is a side elevation of this mechanism.

Figure 2 is an enlarged vertical sectional view of the auxiliary clutch and throw-out mechanism therefor.

Figure 3 is an end elevation partly in section looking to the left in Figure 2.

Figure 4 is a fragmentary detail view of the brake mechanism shown in Figure 2.

Figure 5 is a detail view of the spring abutment of the auxiliary clutch.

This transmission mechanism comprises, generally, driving and driven shafts, the drive shaft being usually the crank shaft of the engine or some part of the fly wheel associated therewith and the driven shaft being a shaft which is connected to the front end of the propeller shaft of the motor vehicle, change speed gearing including shiftable parts as gears or clutches, an operating element for said shiftable parts, a main clutch between the driving shaft and the change speed gearing comprising normally engaged sections, one of which is shiftable and an operating element as a clutch pedal or part operated thereby for shifting the shiftable section, an auxiliary or rear clutch between the transmission gearing and the driven shaft including normally engaged sections one of which is shiftable, normally inactive throw-out mechanism for shifting the shiftable section of the auxiliary clutch, such throw-out mechanism including power means actuated by one of said shafts and connections operated by one of said operating elements for connecting the power means or effectively connecting and disconnecting the throw-out mechanism and the shaft which operates it and so that the auxiliary clutch is shifted out by power and not by force applied by the operator.

The invention further includes power means for actuating the throw-out mechanism of the shiftable clutch section which power means is controlled by the operator and actuated by one of the shafts or elements connected by the clutch.

In transmission mechanisms employing a rear or auxiliary clutch between the transmission gearing and the propeller shaft, the throwing out of the clutch by force applied to the clutch pedal or to the gear shifting lever must be greater than is required in such mechanisms not having a rear or auxiliary clutch, and such additional force must be supplied by the driver, and hence requires additional effort on the part of the driver. This additional effort is obviously objectionable.

In my transmission mechanism, the auxiliary clutch is shifted by power taken from one of the rotating parts present in all such mechanisms in contradistinction to being shifted by a source of power added to such mechanism.

3 is the driven shaft which is connected to the propeller shaft of a motor vehicle.

4 is a casing of the change speed gearing. This gearing may be of any suitable form, size and construction, it usually being of the selective type. 6 is the transmission shaft of the gearing.

The driven shaft 3 is journalled in a casing 31 mounted on the rear wall of the transmission gear case 4 and in a bearing 32 in the inner end of the transmission shaft 6.

The auxiliary clutch is between the shafts 6 and 3 and comprises a section 33 mounted on and rotatable with the shaft 6 and extending into the casing 31, a section 34 rotatable with the shaft 3, interleaved disks 35 interlocked respectively with the sections 33, 34, a shiftable section as a pressure plate 36 arranged to compress the disks and springs 37 acting on the plate to normally hold the disks compressed. This clutch further includes a positive clutch consisting of internal teeth or jaws 38 on the section 33 and external teeth on a head 39 slidable axially of the shaft 3 into and out of engagement with the teeth 38 and normally held in engagement therewith by springs 40. The disk clutch springs 37 are arranged in annular series and are interposed between the web of the section 34 and the bottoms of the sockets 41 formed in the pressure plate 36 for receiving said springs. The springs 40 likewise thrust against the web of the section 34 at like ends, and their other ends against the toothed head 39 or an interposed plate or washer 42. The washer is formed with studs 43 extending into the springs 40. There are usually twelve springs 37 acting to compress the disks and four springs 40 acting to thrust the head 39 into interlocking engagement with the teeth 38. The washer 42 is formed with rearwardly bowed spring buffer portions 44 arranged in line with the bottoms of the sockets 41 in which the springs 37 are located.

The toothed head 39 is carried by a sleeve 45 slidable axially of the shaft 3 and the section 34 has a hub 46 splined to the shaft 3 and held from endwise movement by a thrust bearing or collar 47. The sleeve 45 is also splined to the shaft 3 and is formed lengthwise with slots through which the splines of the hub 46 of the section 34 extend. These slots permit an axial shifting of the sleeve 45 relatively to the section 34 which is held from endwise movement.

The springs 37 and 40 normally hold the disks 35, and the toothed head 39 and teeth 38 engaged. Upon shifting of the sleeve 45 to the right, the toothed head 39 is first drawn out of engagement with the teeth 38 of the clutch section 33 and the springs 40 compressed. Upon further movement of the sleeve 45 to the right, the bowed portions 44 of the washer 42 engage the ends of the sockets 41 for the springs 37 and move the pressure plate 36 to the right to release the compression on the disks 35 so that the clutch is disengaged. Upon discontinuing the force tending to hold the clutch disengaged, the springs 37, 40 react and first permit the disks to engage and thereafter the toothed head 39 to interlock with the teeth 38 of the clutch section 33. The sleeve 45 is provided at its rear end with a suitable throw-out bearing 49.

The power operated throw-out mechanism for operating the throw-out collar 49, that is, for disengaging the auxiliary clutch may be operated by any shaft or element that rotates when the main clutch is thrown off and it is here shown, and preferably, is operated by the driven shaft 3 which rotates when the main clutch is thrown off by the travel or momentum of the vehicle, that is, it is rotated by the rolling of the driving wheels of the vehicle over the ground.

The throw-out mechanism comprises an actuator member as a cam rotatable with the shaft 3, and motion transmitting mechanism operated by the cam and coacting with the throw-out collar 49 and including a cam follower member coacting with the cam and normally out of engagement therewith, and means for shifting one of said members into and out of engagement with the other.

51 designates the cam which is here shown as shiftable axially of the shaft 3 into and out of engagement with the cam follower 52, the cam having an eccentric portion 53 and a concentric portion 54, the eccentric portion having its high part 55 flush or coincident with a part of the concentric portion of the cam.

The motion transmitting means operated by the cam comprises a fork or yoke 56 mounted on studs 57 carried by opposite side walls of the case 31, the arms 58 of the yoke thrusting against the throw-out collar 49 and a lever arm 59 carrying the follower 52 and extending radially relatively to the axis of the yoke 56. This arm 59 is adjustably carried by the yoke and, as here shown, is carried by a yoke pivoted at 61 to the yoke 56 below the axis of such yoke 56. The arm 59 is provided with an adjusting screw 62 threading through a lug 63 projecting upwardly from the arm 59, this screw 62 thrusting against the yoke 56. Preferably, an anti-friction bearing 65 is interposed between the follower 52 and the arm 59.

The cam 51 is shifted axially by means of a fork or yoke 66 mounted on a rock shaft 67 extending transversely of the lower portion of the case 31 and extending to the outside thereof, this fork having pins or blocks 68 working in a groove 69 in the cam 51. Obviously, as the shaft 67 is rocked the cam will be shifted axially. The shaft 67 is provided with an arm 70 at its outer end connected to the operating mechanism to be presently described.

The position of the yoke is adjusted by means of an adjusting screw 71 threading through the bottom of the case 31 and thrusting against a radial arm 73 on the hub of the yoke or fork 66.

Obviously, upon rocking of the shaft 67 rearwardly the fork or yoke 66 will shift the cam 51 to the right and as the cam is rotating with the shaft 3, at some point in its rotation the low point of the cam will pass under the follower 52 so that the follower and arm 59 will be moved about the axis 57 upwardly until the follower 52 is riding on the high point of the cam, whereupon further movement of the fork 66 will cause the concentric part of the cam to move under the follower and hold the arm 59 in its elevated or operated position. The movement of this arm 59 is transferred to the yoke 56 through the set screw 62. When the yoke or fork 56 is operated to disengage the rear clutch, it first withdraws the toothed head 39 out of engagement with the teeth 38 and therefore afterwards shifts the pressure plate 36 to release the disks 35.

In the illustrated embodiment of my invention, the rock shaft is operated from the clutch pedal 30 by suitable connections, here illustrated as comprising a lever arm 74 mounted on the throw-out yoke shaft 28 of the main clutch, and a link 75 connecting the lever arm 74 and the arm 70 on the rock shaft 67 which operates the fork 66 for shifting the cam 51. Depression of the clutch pedal 30 causes the rod 75 to move rearwardly and rock the shaft 67 to the right and shift the cam under the cam follower 52.

A lost motion is provided between the link 75 and the rock arm 70 in order to permit the clutch pedal to be actuated initially far enough to disengage the front clutch before the cam 51 passes under the follower 52 in order that the auxiliary clutch will be disengaged after the main clutch is disengaged or partly disengaged. This lost motion is provided by a shoulder 76 slidable on the link 75 and spaced apart from a rounding head 77 on the end of the arm 70, through which the rod 75 extends. The shoulder 76 is preferably yieldingly mounted and is acted upon by a spring 78 interposed between the shoulder 76 and an adjustable shoulder 79, the position or adjustment of which is determined by nuts 80 threading on the link 75. The spring is of a certain length so as not to normally press the shoulder 76 against the head 77.

Upon depression of the clutch pedal 30, the link 75 is moved rearwardly until the shoulder 76 engages the head 77, and if the low point of the cam 51 is opposite, or in registration with, the cam follower 52, the cam will shift partly under the cam follower and abut against the end face of the concentric portion of the cam. During continued depression of the clutch pedal 30, the sliding movement of the cam is momentarily retarded and at this time the shoulder 76 slides forwardly on the link 75 and compresses the spring 78.

When the high point of the eccentric portion of the cam 51 which high point is flush with the concentric portion comes under the follower, the spring 78 reacts and throws the cam farther rearwardly so that the concentric portion of the cam comes under the cam follower. Obviously, the concentric portion of the cam will hold its auxiliary clutch out as long as the clutch pedal 30 is held depressed. A similar action takes place when upon shifting of the cam 51, the high point of the cam is in register with the follower. Hence, the shifting operation of the cam can not interfere with the operation of the clutch pedal 30.

Also a yielding shoulder 81 is provided for thrusting against the rear side of the spherical head 77, this shoulder acting against the compression spring 82 interposed between the shoulder 81 and a fixed abutment or shoulder 83 held in adjusted position by nut 84 threading on the rear end of the link 75. If for any reason, upon releasing the clutch pedal so that it returns to its normal position under the action of the main clutch spring 23, there is any binding or retarding in the shifting of the cam 51 back to its normal position out of engagement with the follower 52, the shoulder 81 will yield rearwardly during the forward movement of the link 75 and hence will not interfere with the returning of the clutch pedal to its normal position and the engaging of the main clutch. The link 75 is composed of a rod secured at its front end to a clevis 85 which is pivoted at 86 to the lever arm 74.

A suitable brake is provided for retarding the rotation of the rotatable parts of the transmission gearing when the auxiliary clutch is off so that the gears or shiftable parts of the change speed gearing will be idle or nearly idle during the gear shifting operation. This brake as here shown comprises a brake disk 87 rotatable with the clutch section 33 which is integral with the shaft 6 of the change speed gearing, a pressure plate or disk 88 acting on the disk 87 and means for operating pressure disk 88, said means being operable by the throwing out action of the auxiliary clutch.

The disk 87 is interposed between a disk 89 of frictional material fixed to the disk 88 and a similar friction disk 90 fixed to the rear wall of the change speed gear case 4. The means for operating the brake disk comprises a double lever 91 in the form of a ring enclosing the section 34 of the auxiliary clutch and thrusting against a fulcrum at 92 at its lower end and bearing between its ends at diametrically opposite points at 93 on the brake disk 88 and connected at its upper end to the arm 64 of the fork or yoke 56 for the shiftable sections 36 and 39 of the auxiliary clutch. As here illustrated, the connection comprises a link 95 pivoted at 96 to the upper end of the arm 64 of the yoke 56 for the auxiliary clutch and sliding through an opening at the upper end of the annular lever 91 and a spring 96 interposed between a shoulder 97 on the link 95 and the upper end of the lever 91. Obviously, during rocking of the throw-out yoke 56 for the auxiliary clutch the rocking being effected by the cam 51, the upper end of the brake lever 91 will be thrust forwardly causing the pressure disk 88 to apply a braking pressure to the brake disks 87, 89 and 90 and hence retard the rotation of the gears and shafts of the change speed gearing. Upon the reengagement of the auxiliary clutch by a retrograde shifting of the throw-out yoke 56 the brake will be disengaged. The brake lever 91 is loosely or floatingly mounted in the case 31 and is held from rattling in the case by a spring ring 91ª encircling the annular part of the lever 91.

The fulcrum 92 for the brake lever 91 is adjustable to take up for wear, and as here shown comprises a discoidal head eccentrically mounted upon a stud 98 extending through a hole in the bottom of the case 31, it being formed at its outer end with means as a slot for receiving the tool for turning the stud and the eccentric head. The stud is held in its adjustable position in any suitable manner as by a set screw 99.

In operation, the main clutch is thrown off in the usual manner preliminary to a gear shifting operation by depressing the clutch pedal 30, and upon such depression the cam 51 is shifted through the link 75 under the cam follower 52 which acts to operate the throw-out yoke for the auxiliary clutch. The cam owing to the fact that it is rotating performs the actual work of throwing out the auxiliary clutch so that no additional effort is required on the part of the driver to operate the rear clutch. While the main and auxiliary clutches are disengaged and hence while the rotatable parts of the change speed gearing are disconnected from any force tending to turn them, the gear shifting operation is performed and thereafter as the clutch pedal 30 is let in the shiftable sections of the auxiliary clutch are permitted to re-engage by the clutch springs 37 and 40.

This transmission mechanism is particularly advantageous in that the shifting of the rear clutch although controlled by some element operated during gear shifting operations is actually performed by power and preferably by power taken from a driven shaft or a shaft connected to the drive wheels of the vehicle as such shaft is always rotating when the vehicle is in motion regardless of whether the main clutch is on or off. Also by reason of the fact that the rear clutch is shifted from a driven shaft so actuated by the momentum of the vehicle at no time is the rear clutch held from being reengaged and hence under certain conditions as when coasting with the engine dead, the engine can be cranked by letting in the main clutch.

On the other hand, if the shifting of the rear clutch was effected by power taken from the engine shaft under certain conditions, the auxiliary clutch when disengaged would be held from reengaging if the engine stopped while the rear clutch was held off by the cam.

What I claim is:

1. In a transmission mechanism for motor vehicles, the combination with a change speed gearing and a normally engaged clutch disengageable for releasing the gearing from the torque of the propeller shaft of the vehicle, of a rotatable power member, a shifter for the clutch arranged to be actuated by the power member, the power member and the shifter being normally out of coacting position, whereby the clutch is engaged, and operator-operated means to effect the coaction of said power member and the shifter and release the clutch and hence the gearing from the torque of the propeller shaft.

2. In a transmission mechanism for motor vehicles, the combination with a transmission gearing and a clutch for releasing the gearing from the torque of the propeller shaft of the vehicle of a part rotatable with the gearing during the normal operation of the gearing, a shifter connected to the clutch and arranged to be actuated by said part, the said part and the shifter being normally out of coacting position, and operator-operated means for effecting the coaction of the rotatable part and the shifter in order to release the clutch.

3. In a transmission mechanism for motor vehicles, the combination of two shafts, a normally engaged clutch connecting the shafts, a power member connected to one of the shafts to rotate therewith, the clutch including a shiftable section, a shifter member for operating the shiftable section arranged to be actuated by the power member, the shifter member and the power member being normally out of engaged position whereby the clutch remains engaged, operating mechanism for shifting one of said members and operator-operated means for actuating the operating mechanism to effect the engagement of the shifter member and the power member.

4. In a transmission mechanism for motor vehicles, the combination of two shafts, a normally engaged clutch connecting the shafts, a cam rotatable with one of said two shafts, the clutch including a shiftable section, a shifter for operating the shiftable section having a follower for coacting with the cam, the follower being normally out of engagement with the cam whereby the clutch remains engaged, operating mechanism for effecting the engagement of the cam and the follower and operator-operated mechanism for actuating the operating mechanism to effect the engagement of the cam and the follower.

5. In a transmission mechanism for motor vehicles, the combination of two shafts, a normally engaged clutch connecting the shafts, a cam rotatable with one of said two shafts, the clutch including a shiftable section, a shifter for operating the shiftable section having a follower for coacting with the cam, the follower being normally out of engagement with the cam whereby the clutch remains engaged, operating mechanism for effecting the engagement of the cam and the follower operator-operated mechanism for actuating the operating mechanism to effect the engagement of the cam and the follower, the cam having eccentric and concentric portions and the operating mechanism operating to shift the cam first to bring the follower into engagement with the eccentric portion and then into engagement with the concentric portion, whereby the concentric portion holds the follower in the position occupied when the clutch is disengaged.

6. In a transmission mechanism for motor vehicles, the combination of two shafts, a normally engaged clutch connecting the shafts and including a shiftable section, one shaft normally constituting a driver for the other, a power member rotatable with the other shaft, a shifter for the shiftable section of the clutch arranged to be actuated by the power member and normally out of coacting position whereby the clutch remains engaged, operating mechanism for effecting the engagement of the shifter and the power member and operator-operated means for actuating the operating mechanism to effect the engagement of the shifter and the power member.

In testimony whereof, I have hereunto signed my name, at Syracuse, in the county of Onondaga, and State of New York, this 17th day of January, 1925.

GEORGE C. CARHART.